United States Patent [19]

Hung et al.

[11] Patent Number: 5,390,231

[45] Date of Patent: Feb. 14, 1995

[54] PROTECTION AND RECOVERY OF TELEPHONE LINE INTERFACE CIRCUITS

[75] Inventors: Paul F. Hung, Stittsville; Stanley D. Rosenbaum, Ottawa; Joseph F. M. Darveau, Aylmer; Reinhard W. Rosch, Richmond; Brian A. F. S. Sutherland, Ottawa; Francois Y. Tremblay, Hull, all of Canada

[73] Assignee: Northern Telecom Limited, Montreal, Canada

[21] Appl. No.: 41,377

[22] Filed: Apr. 1, 1993

[51] Int. Cl.⁶ ............... H04M 1/24; H04M 1/00; H04M 9/08; H04M 9/26
[52] U.S. Cl. ............................ 379/2; 379/26; 379/34; 379/377; 379/412; 361/71; 361/119
[58] Field of Search ............... 379/377, 399, 412, 2, 379/32, 26, 34, 33, 30; 361/79, 96, 97, 115, 119, 71, 72, 73, 74; 375/10, 76; 370/13, 17; 324/509, 537, 522; 371/66, 7, 14, 20.1

[56] References Cited

U.S. PATENT DOCUMENTS

| | | | |
|---|---|---|---|
| 4,385,336 | 5/1983 | Takeshita et al. | 379/412 |
| 4,709,296 | 11/1987 | Hung et al. | 361/119 X |
| 4,720,845 | 1/1988 | Lechner et al. | 379/412 X |
| 4,897,872 | 1/1990 | Siligoni et al. | 379/412 X |
| 4,947,427 | 8/1990 | Rosch et al. | |
| 5,003,588 | 3/1991 | Winegerath | 379/412 |
| 5,146,384 | 9/1992 | Markovic et al. | 379/412 X |
| 5,222,119 | 6/1993 | Asano | 379/2 |

Primary Examiner—Stephen Chin
Assistant Examiner—Paul Loomis
Attorney, Agent, or Firm—R. John Haley

[57] ABSTRACT

An automatic protection and recovery method for a telephone line interface circuit is described. The interface circuit monitors current on the line, and in the event of a fault producing an excessive current a protection relay interrupts a connection of the interface circuit to the line, and the interface circuit monitors common mode voltage on the line. The interface circuit is reconnected in response to the monitored voltage being below a relatively high threshold. If a second interruption results, the interface circuit is then reconnected in response to the monitored voltage being below a lower threshold. If a further interruption results, the interface circuit enters a ground fault recovery process. The method facilitates protection and rapid recovery from arbitrary fault conditions on the telephone line.

24 Claims, 4 Drawing Sheets

PROTECTION AND RECOVERY OF TELEPHONE LINE INTERFACE CIRCUITS

This invention relates to telephone line interface circuits, and is particularly concerned with the automatic protection and recovery of such a circuit from fault situations on a telephone line to which the circuit is connected in use.

Cross-Reference to Related Applications

Reference is directed to the following related United States patent applications, the entire disclosure of each of which is hereby incorporated herein by reference, which describe various aspects of a versatile programmable telephone line interface circuit:

U.S. Pat. No. 07/862,478 filed Apr. 2, 1992 in the names of S. D. Rosenbaum et al. and entitled "Telephone Line Interface Circuit With Voltage Switching";

U.S. Pat. No. 07/868,893 filed Apr. 16, 1992 in the names of R. W. Rosch et al. and entitled "Telephone Line Interface Circuit With Voltage Control";

U.S. Pat. No. 07/868,941 filed Apr. 16, 1992 in the names of R. W. Rosch et al. and entitled "Wideband Telephone Line Interface Circuit": and U.S. Pat. No. 08/010,244 filed Jan. 28, 1993 in the names of S. A. Gores et al. and entitled "Method Of Providing D.C. Feed To A Telephone Line".

BACKGROUND OF THE INVENTION

It is well known that a telephone line is subject to various types of faults from which sensitive components (e.g. integrated circuits) in interface circuits coupled to the telephone line must be protected. Examples of such faults are surges due to lightning strikes, power line crosses and/or a.c. induction from power lines, other externally applied voltages on the telephone line, and ground faults in which a wire of the telephone line is undesirably grounded. Such faults may be of various durations, for example they may be transient as in the case of lightning surges, they may be of significant but not prolonged duration, or intermittent, as in the case of power line crosses, or they may be of prolonged duration, as in the cases of a.c. induction and ground faults.

In order for a protection arrangement to be effective, it must respond to arbitrary fault conditions before there is any risk of damage being caused to the components of the line interface circuit, without responding inappropriately to conditions which may occur in normal operation of a telephone line interface circuit.

It is well known to protect against lightning surges by providing surge arrestors. As lightning surges have a short duration and occur relatively frequently, it is desirable that other protection facilities either not respond to such surges, or quickly respond and then quickly and automatically reset themselves for normal operation. Automatic, but not necessarily very rapid, resetting of protection facilities on removal of relatively long-duration fault conditions is also required.

These requirements present considerable obstacles to overcoming the problem of providing an effective protection arrangement.

In Rosch et al. U.S. Pat. No. 4,947,427 issued Aug. 7, 1990 and entitled "Protection Arrangement For A Telephone Subscriber Line Interface Circuit" them is described a protection arrangement in which protection relay contacts in series with the line wires are opened in response to an excessive current flowing on the line and through feed resistors connected between the relay contacts and other pans of the line interface circuit. When the relay contacts are open so that current flow is interrupted, the voltage on the line continues to be monitored via connections to the line wires on the line side of the protection relay contacts.

While such an arrangement has considerable advantages, the voltage monitoring when the protection relay contacts are open due to a ground fault is not able to detect when the ground fault is cleared, so that automatic resetting of the protection arrangement following a ground fault is not easily achieved. The relatively common occurrence of ground faults makes this a significant problem.

An object of this invention is to provide an improved automatic protection and recovery method for a telephone line interface circuit.

SUMMARY OF THE INVENTION

According to one aspect of this invention there is provided an automatic protection and recovery method comprising the steps of: interrupting a connection of a telephone line interface circuit to a telephone line in response to a fault condition; and reconnecting the interface circuit to the line in dependence upon at least one criterion, the dependence being different for reconnection after successive interruptions.

In an embodiment of the invention which is described in detail below, the criterion for reconnection after a first interruption is that the common mode voltage on the line be below a relatively high threshold, and the criterion for reconnection after a second interruption, occurring within a predetermined period following the first reconnection, is that the common mode voltage on the line be below a considerably lower threshold. Further criteria, relating to recovery from a presumed ground fault, are used for recovery from a third interruption of the connection.

Accordingly, the method preferably includes the step of monitoring common mode voltage on the line when the connection of the interface circuit to the line is interrupted, the interface circuit being reconnected to the line in response to the monitored common mode voltage being below a threshold, and the threshold being reduced for reconnection after a second interruption which occurs within a predetermined period following reconnection after a first interruption of the connection.

For effective protection, the method desirably includes the step of monitoring current on the line, the connection of the interface circuit to the line being interrupted in response to an excessive monitored current.

In this case the method preferably includes the steps of, in response to interruption of the connection within a predetermined period following a reconnection of the interface circuit to the line: reducing a loop drive voltage for supply from the interface circuit to the line; reconnecting the interface circuit to the line; and determining removal of a ground fault on the line in dependence upon the monitored current on the line supplied with the reduced loop drive voltage. This provides an effective manner in which recovery from a ground fault can be achieved quickly and automatically.

To distinguish successive interruptions of the connection due to a single fault from interruptions due to separate faults, preferably the method includes the step of resetting a count of successive interruptions a predetermined period following reconnection after the last interruption, the criterion for reconnection being determined in dependence upon the count.

It is observed that other criteria may be used for determining reconnection after various interruptions. For example, an initial interruption could be followed after a predetermined time by an automatic reconnection, the criterion in this case simply being expiry of the predetermined time. Alternatively, such a timing function may be combined with monitoring of the line voltage or some other parameter to establish criteria for various reconnections.

According to another aspect this invention provides an automatic protection and recovery method for a telephone line interface circuit coupled to two wires of a telephone line via respective switches, comprising the steps of: monitoring current on the line when the switches are closed; opening the switches in response to an excessive monitored current; monitoring voltage on the line when the switches are open; closing the switches in response to the monitored voltage being below a threshold level; and changing the threshold level between two successive closings of the switches.

Preferably the method includes the step of determining a predetermined period from a first closing of the switches responsive to the monitored voltage being below a first threshold level following a first opening of the switches, and the step of changing the threshold level comprises using a second threshold level, less than the first threshold level, for a second closing of the switches following a second opening of the switches which occurs within the predetermined period. The first and second threshold levels conveniently correspond to a common mode voltage on the line of the order of respectively 180 and 40 volts rms. However, it is observed that these thresholds may be widely varied to suit particular circumstances, and more than two different thresholds may be used for successive reconnections.

Preferably the step of monitoring voltage on the line comprises rectifying and then low pass filtering common mode voltage on the line.

According to a further aspect this invention provides an automatic protection and recovery method for a telephone line interface circuit, comprising the steps of: monitoring current on a wire of a telephone line to which the interface circuit supplies a drive voltage; interrupting a connection of the interface circuit to the wire in response to the monitored current exceeding a threshold value; reducing the drive voltage; reconnecting the interface circuit to the wire; and determining removal of a .ground fault on the wire in dependence upon the monitored current on the wire supplied with the reduced drive voltage.

In this case the step of determining removal of a ground fault on the wire preferably comprises the steps of varying the drive voltage in dependence upon the monitored current on the wire and monitoring the drive voltage.

According to another aspect, this invention provides a method of automatically detecting removal of a ground fault on a two-wire telephone line to which two terminals of a telephone line interface circuit are connected for supplying respective voltages thereto, comprising the steps of: controlling the voltages supplied to the terminals to produce a measurable common mode current in the presence of a ground fault and a relatively small or negligible loop current on the line; and monitoring current on the telephone line to detect removal of the ground fault.

Preferably the step of controlling the voltages supplied to the terminals comprises applying a relatively small or negligible differential voltage to the two terminals to produce said relatively small or negligible loop current on the line.

This method preferably includes the steps of: modifying the voltage supplied to at least one of the two terminals in dependence upon the monitored current to maintain a substantially constant monitored current in the presence of the ground fault; and monitoring the supplied voltage to detect removal of the ground fault.

According to a further aspect, this invention provides an automatic protection and recovery method comprising the steps of: interrupting a connection of a telephone line interface circuit to a telephone line in response to current on the line exceeding a predetermined threshold; monitoring at least one variable to determine whether or not a criterion for reconnection of the interface circuit to the line for normal operation is satisfied; reconnecting the interface circuit to the line for normal operation in response to the criterion being satisfied; and counting successive interruptions of the connection each occurring within a predetermined period following a reconnection of the interface circuit to the line for normal operation, thereby to provide an indication of a state of the line interface circuit.

Such an indication can be communicated from the line interface circuit to central office equipment to which the line interface circuit is coupled, in order to facilitate maintenance operations of the central office.

Conveniently, this method also includes the steps of determining the criterion for each reconnection in dependence upon the count of successive interruptions, and maintaining an interruption of the connection for at least a predetermined period in response to a predetermined count of successive interruptions being reached, this serving to avoid undue repeated operations, or chattering, of a protection relay which effects the interruptions and reconnections.

Another aspect of this invention provides an automatic protection method for a telephone line interface circuit coupled to two wires of a telephone line via respective switches, comprising the steps of: cyclically providing an indication of an overcurrent in response to low pass filtered rectified common mode current on the line exceeding a predetermined threshold; increasing by a first amount, or decreasing by a second, smaller, amount, a variable in dependence upon whether or not, respectively, said indication is provided in each cycle; and opening the switches in response to the variable reaching a predetermined threshold.

This method preferably includes the steps of, while said indication is provided in each cycle, determining any zero crossing of common mode current on the line and opening the switches in response to a determined zero crossing.

BRIEF DESCRIPTION OF THE DRAWINGS

The invention will be further understood from the following description with reference to the accompanying drawings, in which.

DETAILED DESCRIPTION

Figure 1:
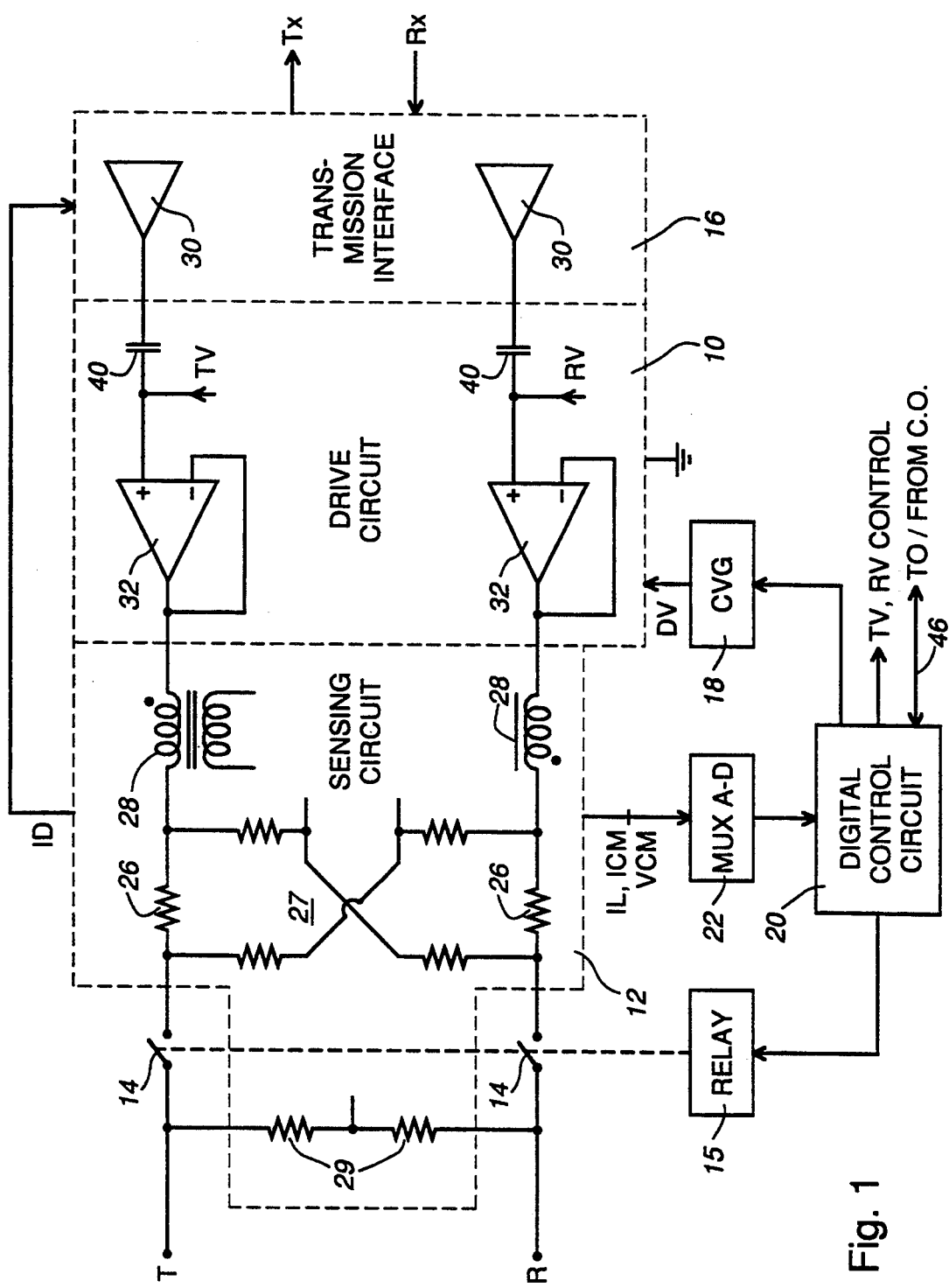
FIG. 1 is a schematic diagram illustrating pans of a telephone line interface circuit which is arranged to operate in accordance with this invention.

FIG. 1 illustrates parts of a telephone line interface circuit, which is assumed in the following description to form part of and be located at a telephone central office or C.O. (not shown), but which may alteratively form part of a remote terminal which is coupled to a C.O. via a multiplexed communications path. Only those parts of the line interface circuit which are relevant to a full understanding of this invention are shown in FIG. 1.

As shown within broken lines, the line interface circuit comprises a drive circuit 10 which is coupled to terminals T and R, for connection to the tip and ring wires of a two-wire telephone line, via a sensing circuit 12 and contacts 14 of a protection relay 15. The drive circuit 10 is also coupled to a transmission interface 16 which communicates with the remainder of the C.O. via transmit and receive signal paths Tx and Rx respectively. The line interface circuit also includes a controlled voltage generator or CVG 18, a digital control circuit 20, and a multiplexing analog-to-digital (A-D) converter 22.

The drive circuit 10, sensing circuit 12, transmission interface 16, and digital control circuit 20 are conveniently of the form fully described in the related United States patent applications already referred to. The CVG 18 is conveniently of the form described in Rosenbaum et at. U.S. Pat. No. 5,103,387 issued Apr. 7, 1992 and entitled "High Voltage Converter". Only those parts of the sensing circuit 12, drive circuit 10, and transmission interface 16 which are necessary for a full understanding of this invention are illustrated in FIG. 1 and are described below.

The sensing circuit 12 includes a balanced arrangement of feed resistors 26 connected in series with windings of a small a.c. sensing transformer 28 between the outputs of the drive circuit 10 and the contacts 14, a current sensing resistor network 27, and a common mode voltage sensing network comprising two resistors 29 connected in series between the terminals T and R. In a manner which is fully described in U.S. patent application No. 07/868,941 referred to above, the sensing circuit produces from outputs of the components 27 to 29 output signals ID, IL, ICM, and VCM. The signal ID represents the differential a.c. or signal current on the telephone line and hence flowing via the terminals T and R, and is supplied to the transmission interface 16. The signal IL represents the loop current on the telephone fine, i.e. direct current flowing in opposite directions via the two terminals T and R, and the signal ICM represents the longitudinal or common mode current on the telephone line, i.e. current flowing in the same direction via the two terminals T and R. Individual currents on the tip and ting wires of the telephone line are respectively the sum and difference of the common mode current and the loop current. The signal VCM represents a common mode voltage on the telephone line when the contacts 14 of the protection relay 15 are open.

The transmission interface 16 produces a signal on the transmit path Tx from the differential current signal ID, and includes amplifiers 30 having low impedance outputs, constituting outputs of the transmission interface 16 coupled to the drive circuit 10, at which are produced complementary signals derived from a signal received via the receive path Rx.

The drive circuit 10 comprises two d.c. buffer amplifiers 32, associated with the tip and ring terminals T and R respectively, each of which has its output, constituting a respective output of the drive circuit 10, connected to its inverting input to provide the amplifier with a unity gain so that these amplifiers have a maximum bandwidth and a minimum output impedance. Each amplifier 32 has its non-inverting input connected via a capacitor 40 to a respective output of the transmission interface 16. The non-inverting inputs of the amplifiers 32 are also supplied with d.c. voltages, TV and RV for the tip and ring sides respectively of the drive circuit, which are controlled by the digital control circuit 20 and determine the voltages at the outputs of the amplifiers 32 and hence at the terminals T and R when the contacts 14 are closed. The drive circuit 10 is supplied with power from supply rails which are at potentials of ground (zero volts) and a voltage DV which is produced by the CVG 18 under the control of the digital control circuit 20.

The signals IL, ICM, and VCM produced by the sensing circuit 12 are supplied to inputs of the multiplexing A-D converter 22, whose digital outputs are supplied to the digital control circuit 20. The digital control circuit 20 monitors the digitized signals and operates in accordance with a stored program, for example downloaded from the C.O. with which it communicates via a path 46, to determine appropriate operating conditions for the remainder of the line interface circuit. In normal operation the relay contacts 14 are closed and, as described fully in the related applications already referred to, the digital control circuit 20 monitors the loop current IL to determine the hook state of a telephone connected via a telephone line to the terminals T and R. In the off-hook state, the digital control circuit 20 controls the voltage DV and the voltages TV and RV to provide a limited loop current while maintaining adequate headrooms (voltages by which the voltages TV and RV, and hence the output voltages of the amplifiers 32 and the terminals T and R, are offset from the supply voltages, 0 V and DV respectively for normal polarity drive to the telephone line) to accommodate signal transmission via the amplifiers 32.

It should be appreciated that the arrangement of the protection relay contacts 14, with the voltage sensing resistors 29 on the telephone line side of these contacts and the feed resistors 26 and current sensing network 27 on the line interface circuit side of these contacts, corresponds to the protection arrangement of U.S. Pat. No. 4,947,427 referred to above.

The digital control circuit 20 operates cyclically, performing a variety of software functions in respective time slots every 0.5 ms. These software functions include, for example, the current limiting referred to above, calibrating the sensed currents, and updating a timer which is used for timing various waiting periods. These functions also include a protection process described below, which accordingly embodies a software protection routine which is returned to every 0.5 ms. This protection routine is represented by the flow chart in FIG. 2.

The protection routine is executed as pan of the normal operations of the digital control circuit 20. If a fault occurs, causing operation of the protection relay 15 to open its contacts 14 as described below, the normal operations are interrupted and a separate, recovery, process is executed by the digital control circuit 20. A purpose of the recovery process is to facilitate the earliest possible safe closing of the protection relay contacts 14 after a fault, so that normal operation of the line interface circuit can be resumed.

Briefly described, the protection routine monitors the common mode current ICM and, in the event of an excessive current, opens the relay contacts 14 at a zero crossing in the case of a high voltage a.c. fault, or on accumulating in an overcurrent counter a count which exceeds a threshold in the case of a lower voltage a.c. fault or a d.c. fault. In the case of a lightning surge, either the relay contacts remain closed, or they will be quickly opened and quickly closed again in the first state of the recovery process described below.

Figure 2:
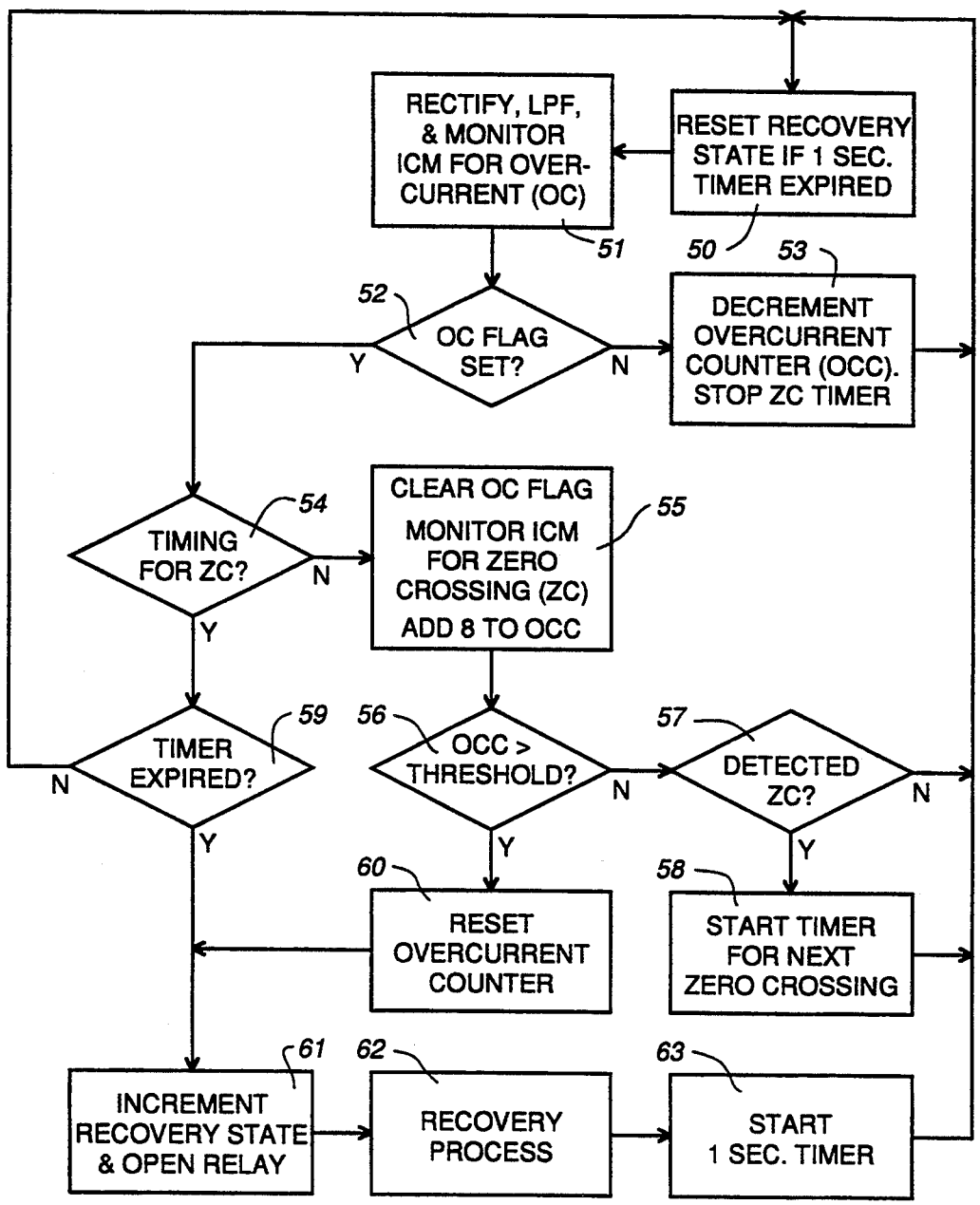
FIG. 2 is a flow chart with reference to which protection operations in the telephone line interface circuit of FIG. 1 are explained.

Referring to FIG. 2, the protection routine is illustrated as being entered at a block 50, in which a recovery state parameter is reset to zero if a 1 second timer has expired. This is discussed further below. A block 51 illustrates that the common mode current ICM is rectified, low pass filtered, and monitored, an overcurrent (OC) flag being set if an excessive current is detected in this monitoring.

As described above with reference to FIG. 1, the common mode current ICM is supplied as a digital value to the digital control circuit 20. The low pass filter is implemented as a software routine in the digital control circuit 20, with a time constant of for example 4 ms to facilitate a rapid overcurrent detection. As should be appreciated, this low pass filtering of the rectified common mode current digital value serves to integrate the monitored current value over time, thereby filtering out transients for example due to lightning surges, so that the protection routine is relatively unresponsive to such transients as is desired. In the event that the output of the low pass filter exceeds a predetermined threshold level stored in the digital control circuit 20, the circuit 20 sets the overcurrent flag. For example, this threshold level can normally correspond to a common mode current of 100 mA, and can be increased to correspond to a current of 120 mA during ringing or coin signalling operations.

In a block 52, the overcurrent flag is checked to determine whether or not it is set to indicate an excessive current. If the flag is not set, corresponding to a normal operating situation, then in a block 53 an overcurrent counter, discussed below, is decremented if it has a count greater than zero, and a zero crossing timer, also discussed below, is stopped if it is running. The protection routine is then ended until the next time slot.

If it is determined at the block 52 that the overcurrent flag is set, then in a block 54 a decision is made as to whether or not the zero crossing timer is running. If not, then a block 55 is reached. At this point it is established that an excessive current exists, but the nature of the condition causing this is unknown. In particular, it could be due to a lightning surge, or an excessive a.c. voltage on the telephone line, or a d.c. fault condition such as a ground fault, or a normal operating condition such as the grounding of the ting wire of the telephone line for up to 250 ms for PBX signalling in known manner. To help in distinguishing among these situations, in the block 55 the digital control circuit 20 monitors the common mode current ICM value to detect any zero crossing, which would correspond to an a.c. fault condition, and adds 8 to the overcurrent counter (OCC) already referred to. The overcurrent flag is also cleared in the block 55, so that it can be set again if appropriate in the next cycle through the protection routine.

In a subsequent block 56, it is determined whether or not the count of the overcurrent counter exceeds a threshold of, for example, 4096 (hexadecimal 1000). This threshold is reached if the overcurrent counter is increased by 8, and not decremented, as described above in each cycle through the protection routine for a period of 256 ms, which is longer than the maximum PBX signalling period referred to above. Thus over time a distinction is made between a d.c. fault condition, which causes the count of the overcurrent counter to increase until the threshold is exceeded, and a normal PBX signalling condition, which causes the count of the overcurrent counter to increase to a level below the threshold and then to decrease (due to decrementing in the block 54) to zero over a period of time.

In addition, if the telephone line is subject to a relatively low voltage a.c. fault which is sufficient to cause the overcurrent flag to be set near the peaks of the a.c. cycles but not near the zero crossings of these cycles, then in successive 0.5 ms time slots the count of the overcurrent counter will be increased in each case by 8 in the block 55 or decreased in each case by 1 in the block 53. Again in this situation the count of the overcurrent counter will be progressively increased over a period of time until the overcurrent count threshold is exceeded. For higher voltage a.c. faults, the low pass filtering of the rectified common mode current ICM being monitored is sufficient to ensure that the overcurrent flag is set throughout each a.c. cycle.

If in the block 56 it is determined that the overcurrent count threshold is not exceeded, then in a block 57 it is determined whether or not a zero crossing of the monitored common mode current value has been detected. If not, the protection routine cycle is ended until the next time slot.

If a zero crossing has been detected, then in a block 58 the zero crossing timer is started for opening the protection relay contacts 14 substantially at the next following zero crossing, it being assumed that a 60 Hz a.c. fault has caused the excessive current. The timer is set to accommodate delays in operation of the protection relay 15 and for processing of signals in the digital control circuit 20 to control this relay. In subsequent time slots every 0.5 ms, as long as the fault persists so that the overcurrent flag is set each time, in the block 54 it is determined that timing for a zero crossing is taking place, and in a block 59 a delay is implemented until the desired time for instructing the protection relay 15 to open its contacts.

In the event that, for example due to a lightning surge having an exponential decay including zero crossings, the zero crossing timer is started in the block 58 and subsequently the common mode current falls below the excessive current threshold so that the overcurrent flag is not set, then the zero crossing timer is stopped in the block 53 with decrementing of the overcurrent counter. Thus the protection routine does not open the relay contacts 14 in response to such a lightning surge.

In the case of a relatively low voltage a.c. fault condition or a d.c. fault condition, as explained above the overcurrent count eventually exceeds the threshold, so that from the decision in the block 56 a block 60 is reached in which the overcurrent counter is reset to zero. In this case, and in the case of a high voltage a.c. fault condition on expiry of the zero crossing timer, a block 61 is reached in which the protection relay is controlled by the digital control circuit 20 to open its contacts, and the recovery state parameter already mentioned above is incremented. The recovery process, represented in FIG. 2 by a block 62, is then entered. On returning from the recovery process as described below and entry again into the protection routine, the 1 second timer is started in a block 63 at the end of the protection routine cycle.

On reaching the recovery process block 62, the digital control circuit 20 has concluded that either an a.c. fault or a d.c. fault exists, but it is unaware of the nature of this fault. The recovery process operates to recover from various fault conditions in an automatic, fast, and effective manner on removal of the fault conditions. To this end, the recovery process incorporates successive attempts at recovery by reclosing the protection relay contacts 14 under specific conditions, which attempts may achieve the desired recovery or may result in another protection switch (opening of the protection relay contacts) through operation of the protection routine as described above. The recovery state parameter serves as a software counter for these successive attempts at recovery, and the 1 second timer serves to distinguish protection switches, due to successive attempts at recovery from a single fault, from protection switches due to separate fault conditions.

Thus on each exit from the recovery process 62, the 1 second timer is started at the block 63. If another protection switch occurs within the 1 second period of this timer, then the recovery state parameter is incremented to the next higher value in the block 61, it being concluded that the recovery attempt was unsuccessful. If the 1 second time period expires without another protection switch, then in the block 50 the recovery state parameter is reset to zero, so that on any subsequent protection switch the recovery state parameter is incremented to 1 in the block 61 and it is assumed that the protection switch is due to a new fault condition separate from any previous fault condition. Obviously, the period of 1 second may be varied to suit particular desired operating conditions, and different periods could be used following recovery from different recovery states.

Figure 3:
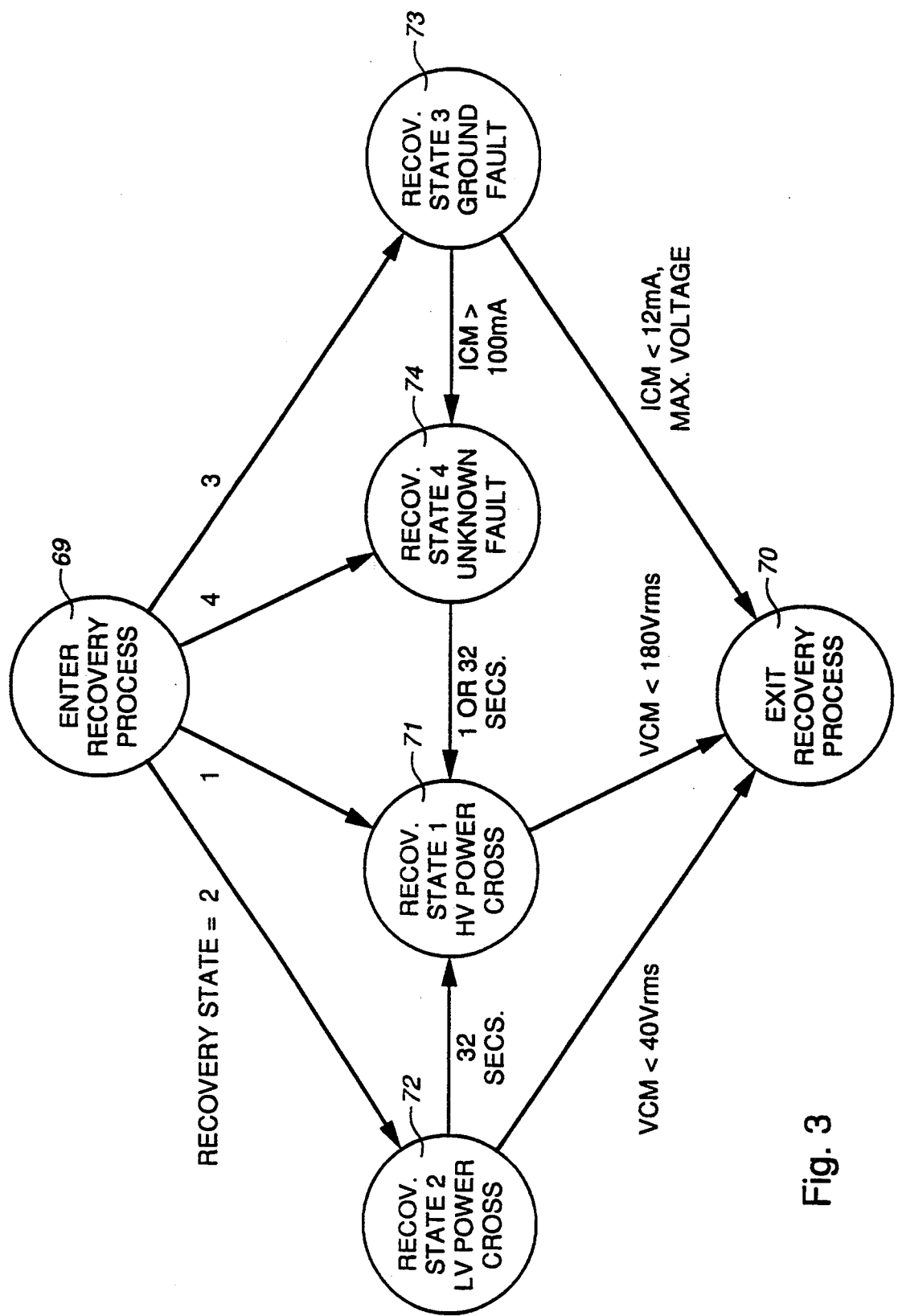
FIG. 3 is a state diagram illustrating states in a recovery process in the telephone line interface circuit of FIG. 1.

The recovery process block 62 in FIG. 2 is represented by the recovery state diagram in FIG. 3, which is entered as illustrated by an entry state 69 and which is exited as illustrated by an exit state 70. Four possible recovery states, corresponding to values of the recovery state parameter from 1 to 4, are represented in FIG. 3 by states 71 to 74 respectively. Thus from the entry state 69, one of the states 71 to 74 is reached depending on the value of the recovery state parameter, as indicated by arrowed lines from the state 69 to the states 71 to 74 and the recovery state numbers adjacent these lines. Other arrowed lines in FIG. 3 similarly indicate transitions between states, with conditions being indicated adjacent these lines which must be met for these transitions to occur, as further described below.

Within the recovery state circles 71 to 74, possible fault conditions are also identified from which the respective recovery states are designed to provide recovery. Thus the first recovery state 71 is directed towards rapid recovery from a lightning surge which has caused the protection relay contacts to have been opened or recovery from a high voltage (HV) power cross on the telephone line, the second recovery state 72 is directed towards recovery from a lower voltage (LV) power cross on the telephone line, the third recovery state 73 is directed towards recovery from a ground fault, and the fourth recovery state 74 corresponds to an unknown fault condition from which an automatic recovery is not directly attempted. It is important to appreciate that the digital control circuit 20 has no actual knowledge of the nature of a fault condition which has triggered a protection switch. The various recovery states only seek to recover quickly from unknown situations when particular conditions are satisfied.

On occurrence of a protection switch in the event of a new fault condition, as described above the recovery process is entered with the recovery state=1, and the first recovery state 71 is reached. In this state the currents IL and ICM are interrupted by the open relay contacts 14, and the longitudinal or common mode voltage VCM on the line is monitored by the digital control circuit 20. While the monitored common mode voltage VCM remains above a relatively high threshold value, 180 Vrms as indicated in FIG. 3, the digital control circuit 20 assumes that the fault condition is still present and stays in this first recovery state 71 accordingly. If the monitored voltage falls below this threshold value, the digital control circuit 20 makes an assumption that a lightning surge or a high voltage power cross has caused the fault and that the fault condition has terminated, and controls the protection relay 15 to close the contacts 14 accordingly and exits the recovery process at state 70. If this first assumption is correct, then the recovery will be successful and them will be no further protection switch due to the same fault. Thus them is a quick recovery from any protection switch due to a lightning surge and on termination of a fault due to a high voltage power cross. The 1 second timer, which is set at block 63 on returning to the protection process, will subsequently expire and the recovery state parameter will be reset to zero at the block 50.

If the first assumption above is incorrect and a fault condition which caused the initial protection switch is still present, then the closing of the relay contacts 14 will restore the original circumstances and another protection switch will occur, within the period of the 1 second timer. In this case the recovery state parameter is not reset but is incremented to 2 at the block 61, so that on entry into the recovery process the second recovery state 72 is now reached. This will be the case if the fault is due to a voltage, lower than the high threshold voltage, being applied to the telephone line.

In the state 72 again the common mode voltage VCM on the line is monitored by the digital control circuit 20. While the monitored common mode voltage VCM remains above a lower threshold value, 40 Vrms as indicated in FIG. 3, the digital control circuit 20 assumes that the fault condition is still present and stays in this second recovery state 72 for a period of up to 32 seconds as indicated in FIG. 3. If the monitored voltage falls below this lower threshold value, the digital control circuit 20 makes a second assumption, that a lower voltage power cross has caused the fault and that the fault condition has terminated. Accordingly it controls the protection relay 15 to close the contacts 14 and exits the recovery process at state 70. If this second assumption is correct, then the recovery will now be successful and there will be no further protection switch due to the same fault. Again, the 1 second timer will be set at block 63 on returning to the protection process and will subsequently expire, the recovery state parameter being reset to zero at the block 50.

The operation of the recovery process in the first and second recovery states 71 and 72 is described further below with reference to the flow chart in FIG. 4.

After a period of 32 seconds in the second recovery state 72, a transition is made to the first recovery state 71 (the recovery state parameter being reset to 1) in order to avoid a lock-up situation in the event that an induced voltage remains on the telephone line after a fault condition which has caused a protection switch has ended, the induced voltage being sufficient to prevent a transition from the state 72 to the exit state 70 but not being sufficient to adversely affect normal telephone service. In this case the high threshold of the first recovery state 71 is not exceeded, so that the transition to state 71 is followed by a successful exit from the recovery process via the state 70 without a subsequent protection switch.

If the second assumption above is incorrect and a fault condition which caused the initial protection switch is still present, then a further protection switch will occur, within the period of the 1 second timer, with the recovery state parameter being incremented to 3 at the block 61, so that on entry into the recovery process the third recovery state 73 is now reached. The most likely cause of the fault condition in this case is a ground fault, but other possible causes are a particularly low foreign voltage applied to the line, or an intermittent power cross. The third recovery state 73 attempts to recover from a ground fault.

In the case of normal polarity applied from the drive circuit 10 to the telephone line via the terminals T and R, the terminal T is close to 0 volts or ground potential, and the terminal R is close to the drive circuit supply voltage DV. A ground fault in this case could connect the ring wire to ground, resulting in a relatively high current flowing on the ring wire and a low current flowing on the tip wire, corresponding to a high common mode current (half the sum of the currents on the tip and ring wires) and a high loop current (half the difference of the cents on the tip and ring wires). The resulting large monitored common mode current ICM results in a protection switch as described above with reference to FIG. 2. As a result, the currents are interrupted.

However, monitoring of the common mode voltage VCM on the line while the contacts 14 are open is of no assistance in determining the continued presence or removal of the ground fault. An automatic and immediate return to normal operation is required on removal of a ground fault, and this is especially important in view of the relatively frequent occurrence of ground faults.

In order to monitor for the continued presence or removal of a ground fault, the third recovery state 73 operates to control the voltages applied to the terminals T and R in such a manner that, with the relay contacts 14 closed and while the ground fault continues to exist, a measurable common mode current ICM flows and the loop current IL is kept very small so that no damage can result to the line interface circuit. The voltage applied to the terminal R (with normal polarity) is then varied under the control of a closed feedback loop, and is monitored to determine removal of the ground fault. This is explained in detail below with reference to FIG. 5, and is represented in FIG. 3 by an arrowed line from the third recovery state 73 to the exit state 70 with the conditions that the common mode current ICM be less than 12 mA and a maximum voltage be applied from the drive circuit 10 to the terminal R (assuming normal polarity).

If in the third recovery state 73 the common mode current ICM exceeds the excessive current threshold of 100 mA already discussed above, then a further protection switch occurs in a similar manner to that described above with reference to FIG. 2, the recovery state parameter being increased to 4. For simplicity this is illustrated in FIG. 3 by an arrowed line from the state 73 to the state 74. Such a situation could occur, for example, in the event of a lightning surge or high voltage power cross occurring while a ground fault exists.

If a further protection switch occurs within the period of the 1 second timer following an exit from the recovery process with the recovery state=3, then the recovery state parameter is again incremented at the block 61 and on re-entry to the recovery process the fourth recovery state 74 is reached. This corresponds to an unknown fault condition (for example, a very low foreign voltage applied to the line, or an intermittent power cross, or a combination of faults, as mentioned above) for which manual investigation is desirable. Accordingly, there is no direct path from the state 74 to the exit recovery process state 70. However, after a period of either 1 or 32 seconds the recovery state parameter is reset to 1 and a transition is made from this fourth recovery state 74 to the first recovery state 71 (without the protection relay contacts being closed and without any intervening return to the protection process of FIG. 2) so that further recovery attempts can be made automatically in the same sequence as described above. Thus even in the case of an unknown fault condition an automatic recovery may be made. The 1 second delay period is used the first time that the fourth recovery state 74 is reached, to promote a prompt recovery to normal operation, and subsequently the 32 second delay period in the fourth recovery state is used to avoid excessively frequent operations, or chattering, of the protection relay 15, thereby preventing excessive wear of the relay contacts 14.

As indicated above, the recovery state parameter constitutes a software counter of successive attempts at protection recovery, and as such is stored in the digital control circuit 20. The state of this parameter or counter constitutes an indication of the status of the line interface circuit, and can be monitored accordingly. The digital control circuit 20 can be programmed to send messages to the C.O via the path 46, in order to convey information concerning the prevailing protection or recovery status, at any desired points in the protection process and/or the recovery process. Alternatively, or in addition, the digital control circuit 20 can be programmed to respond to polling by the C.O. to convey such information. Such messaged information, including at least the recovery state parameter, can be used in the C.O. to trigger desired actions, such as investigation of an unknown fault as discussed above, or automatic removal from service of faulty circuits. Thus, through such conveyed information including the recovery state parameter, maintenance operations of the C.O. can be considerably enhanced.

For example, the digital control circuit 20 can be programmed to supply to the C.O. a signal representing the protection status of the line interface circuit, i.e. whether the relay contacts 14 are open or closed, together with the recovery state parameter, on expiry of a predetermined period, for example 1 second, following the last change of either the protection status or the recovery state parameter. This ensures that the C.O. is informed of protection switches and fault conditions, without an undue burden for communicating messages being placed on the digital control circuit 20.

Figures 4, 5:
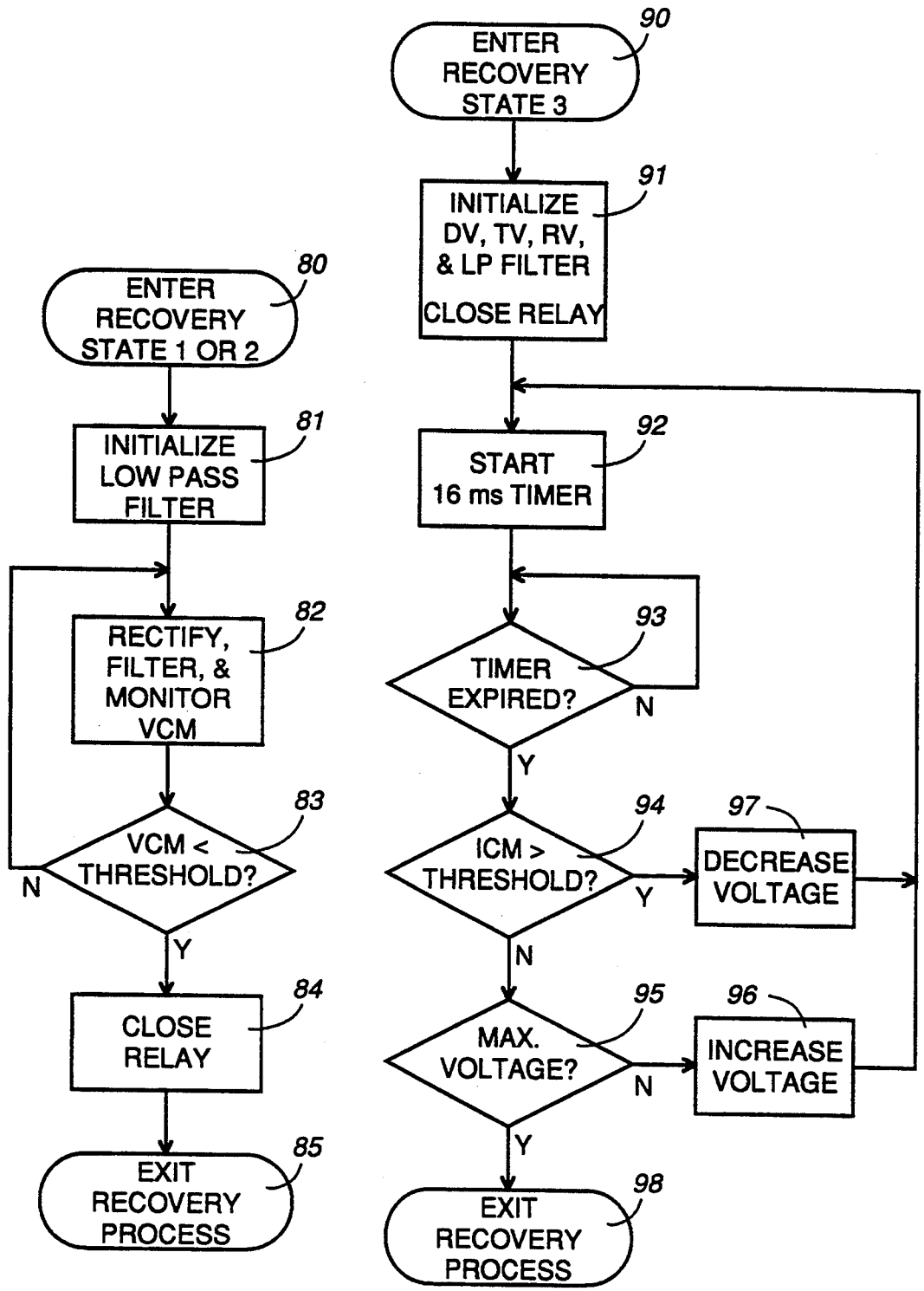
FIGS. 4 and 5 are flow charts with reference to which recovery process operations of the telephone line interface circuit of FIG. 1 are explained.

Referring now to FIG. 4, the operation of the recovery process in the first and second recovery states is described. The operation is the same for each state, except for different initialization and thresholds as described below.

Entry into the first or second recovery state, corresponding to the state 69 in FIG. 3 with the recovery state=1 or 2, is represented by a block 80 in FIG. 4. In a subsequent block 81 a low pass filter is initialized for performing low pass filtering, or integration, of the common mode voltage VCM, which is rectified, filtered, and monitored as represented by a block 82. The output of the low pass filter, representing the filtered rectified voltage VCM, is compared with a threshold as represented by a decision block 83, a return to the block 82 being made if the voltage VCM has not fallen below the threshold. If the voltage VCM is below the threshold, then the digital control circuit 20 controls the protection relay 15 to close its contacts 14 as shown by a block 84, and the recovery process is exited as shown by a block 85, corresponding to the state 70 in FIG. 3.

The low pass filter for filtering the common mode voltage VCM is implemented as a software routine in the digital control circuit 20, operating as a leaky accumulator in accordance with the equation:

$$LPFout(n) = LPFin + ((t-1)/t)LPFout(n-1)$$

where:

n represents a current sample;

n−1 represents the previous (0.5 ms earlier) sample;

t is a time constant, for example 64 to represent a 32 ms period;

LPFin represents a digital value input to the low pass filter; and

LPFout represents a digital value output by the low pass filter.

Because the recovery process is entered due to a protection switch which may typically be due to a high voltage, and the decision at block 83 detects the falling of the filtered value of the monitored voltage below a threshold, the initialization of the low pass filter at the block 81 sets an initial value, to be used as the value LPFout(n−1) in the low pass filter equation, which reflects an initially high voltage. The threshold with which the comparison is made in the block 83 is a lower value of the low pass filter output LPFout, corresponding to a reduced value of the monitored voltage VCM integrated over time.

In one implementation of the line interface circuit, a one-bit change in the input to the low pass filter corresponded to a change in the voltage VCM of about 2.33 volts. The high threshold of 180 Vrms used for the first recovery state corresponds to an average for a rectified sine wave of $180 \times 2\sqrt{2}/\pi = 162$ volts, the rectification being performed by supplying only the magnitude of the voltage VCM to the input of the low pass filter. With t=64, this gives a steady state value for the low pass filter of 4458 ($64 \times 162/2.33$). The initialization value used in the block 81 for the low pass filter is selected to be 1.25 times this, i.e. 5572 or hexadecimal 1534, and the threshold used in the block 83 is selected to be about 1.05 to 1.1 times this, conveniently 4608 or hexadecimal 1200.

Correspondingly, the second recovery state threshold of 40 Vrms corresponds to an average for a rectified sine wave of 36 volts and a steady state value of 991. The low pass filter initialization value is selected to be 1.25 times this, i.e. 1239 or hexadecimal 04D7, and the threshold is selected to be about 1.05 to 1.1 times this, conveniently 1024 or hexadecimal 0400.

Referring now to FIG. 5, the operation of the recovery process in the third recovery state is described. For simplicity and clarity the following description initially assumes normal polarity operation and checking for recovery from a ring-ground fault.

In normal polarity operation, as already explained, the digital control circuit 20 controls the voltage DV and the voltages TV and RV to maintain adequate headroom voltages by which the voltages TV and RV, and hence the output voltages of the amplifiers 32 and the terminals T and R, are offset from the supply voltages, 0 V and DV respectively, to accommodate signal transmission via the amplifiers 32. For convenience, the labels TV and RV are also used below to refer to the output voltages of the drive circuit amplifiers 32. The headroom voltages may for example be 3.5 V, so that the voltage TV may be offset from 0 V to −3.5 V, and the voltage RV may be offset from the supply voltage DV to DV+3.5 V, DV typically being in a range from about −10 V to about −56 V and being controlled by the digital control circuit 20 to provide a limited current on the telephone line when a connected telephone is off-hook.

Entry into the third recovery state, corresponding to the state 69 in FIG. 3 with the recovery state=3, is represented by a block 90 in FIG. 5. In a subsequent block 91 the digital control circuit 20 initializes the voltages DV, TV, and RV and the low pass filter for ground fault recovery, and then controls the protection relay 15 to close its contacts 14.

More specifically, the supply voltage DV for the drive circuit 10 is set to its smallest magnitude of −10 V, the voltage TV is set to −3.5 V to provide a normal tip headroom, and the voltage RV is set to DV+6.5 V=−3.5 V. A full description of how these voltages are controlled and established is contained in U.S. patent application No. 08/010,244 already referred to, it being sufficient here to observe that the voltages TV and RV can be changed in steps of about 0.25 V. The settings of the voltages TV and RV serve to place both of these voltages close together and close to ground or 0 V, on the assumption that there is a ground fault. Thus on closing of the relay contacts 14 there is a negligible loop current IL because the voltages TV and RV are substantially the same, and a small but measurable common mode current ICM via a conducting path to ground if there is a ground fault.

The same software low pass filter as described above for the first and second recovery states is used for filtering the unrectified common mode current ICM in the ground fault recovery process, and as indicated in the block 91 the filter is initialized, to an LPFout value of zero. The relay contacts 14 are then closed.

In a following block 92 a 16 ms timer is started, and as indicated by a block 93 there is a wait for the end of this 16 ms period, which serves to provide a settling time following each voltage change as described below and is about the period of any 60 Hz ripple which may be present and which is therefore attenuated. At the end of this period a block 94 is reached, in which it is determined whether or not the common mode current ICM exceeds a threshold. For example, the threshold has a value of 768 or hexadecimal 0300, corresponding to a current of 12 mA for t:=64 in the low pass filter equation.

If the current ICM does not exceed the threshold, then in a block 95 it is determined whether a maximum voltage RV has been reached. As a normal ring headroom of 3.5 V would provide a voltage RV of DV+3.5=−6.5 V, this is used as the maximum voltage for the decision block 95. If this maximum voltage has not been reached, i.e. if the voltage RV is more positive and hence closer to 0 V than this, then in a block 96 the magnitude of the voltage RV is increased. i.e. RV is made more negative, by 0.25 V. A return is then made to the block 92 in which the 16 ms timer is restarted for a new settling period.

In the event that a ground fault is present and continues to exist, successive increases in the magnitude of the voltage RV in the block 96 will cause the threshold common mode current of 12 mA to be exceeded as determined in the block 94, resulting in a block 97 being reached in which the voltage RV is decreased, i.e. RV is made more positive, by 0.25 V, down to a minimum magnitude of −3.5 V. The block 92 is then again returned to. Thus while a ground fault persists, the voltage RV will be maintained at a level to provide a common mode current ICM of about 12 mA, this being monitored every 16 ms so that removal of the ground fault can be determined.

On removal of a ground fault, the common mode current ICM will fall so that the 12 mA threshold will no longer be exceeded as the magnitude of the voltage RV is increased, so that the maximum voltage magnitude of −6.5 V will be reached as determined in the block 95. In consequence, a block 98, corresponding to the exit recovery process state 70 in FIG. 3, is reached and the protection process of FIG. 2 is returned to in the same manner as already described above. With increases of 0.25 V every 16 ms through a maximum range of −3.5 V to −6.5 V, it follows that removal of a ground fault is detected within a maximum period of about 200 ms.

Although the above description refers only to the magnitude of the voltage RV being increased and decreased, it is desirable also to increase and decrease the voltage TV in exactly the same manner and at the same time so that the voltages TV and RV are substantially the same throughout the ground fault recovery process. This maintains a negligible loop current IL throughout the ground fault recovery process, and also facilitates recovery from a tip-ground fault in reversed polarity operation of the line interface circuit. Alteratively, only the voltage RV can be varied as described above for recovery from a -ring-ground fault in normal polarity operation, and only the voltage TV can be similarly varied for recovery from a tip-ground fault in reversed polarity operation.

In addition, although not illustrated in FIG. 5, as already described with reference to FIGS. 2 and 3 the common mode current ICM is monitored throughout the ground fault recovery process, so that in the event of an a.c. fault causing the excessive current threshold of 100 mA to be exceeded this is detected, a new protection switch is effected to open the relay contacts 14, and the fourth recovery state 74 is reached.

Although a particular embodiment of the invention has been described in detail, it should be appreciated that numerous modifications, variations, and adaptations may be made without departing from the scope of the invention as defined in the claims.

What is claimed is:

1. An automatic protection and recovery method comprising the steps of:
   interrupting a connection of a telephone line interface circuit to a telephone line in response to a fault condition;
   reconnecting the interface circuit to the line in dependence upon at least one criterion; and
   changing the criterion for reconnection after successive interruptions.

2. A method as claimed in claim 1 and including the step of monitoring common mode voltage on the line when the connection of the interface circuit to the line is interrupted, wherein the interface circuit is reconnected to the line in response to the monitored common mode voltage being below a threshold, and the threshold is reduced for reconnection after a second interruption which occurs within a predetermined period following reconnection after a first interruption of the connection.

3. A method as claimed in claim 2 and including the step of monitoring current on the line, wherein the connection of the interface circuit to the line is interrupted in response to an excessive monitored current.

4. A method as claimed in claim 3 and including the steps of, in response to interruption of the connection within a predetermined period following a reconnection of the interface circuit to the line:
   reducing a loop drive voltage for supply from the interface circuit to the line;
   reconnecting the interface circuit to the line; and
   determining removal of a ground fault on the line in dependence upon the monitored current on the line supplied with the reduced loop drive voltage.

5. A method as claimed in claim 1 and including the step of monitoring current on the line, wherein the connection of the interface circuit to the line is interrupted in response to an excessive monitored current.

6. A method as claimed in claim 5 and including the steps of, in response to interruption of the connection within a predetermined period following a re, connection of the interface circuit to the line:
   reducing a loop drive voltage for supply from the interface circuit to the line;
   reconnecting the interface circuit to the line; and
   determining removal of a ground fault on the line in dependence upon the monitored current on the line supplied with the reduced loop drive voltage.

7. A method as claimed in claim 1 and including the step of resetting a count of successive interruptions a predetermined period following reconnection after the last interruption, said criterion being determined in dependence upon said count.

8. An automatic protection and recovery method for a telephone fine interface circuit coupled to two wires of a telephone line via respective switches, comprising the steps of:
   monitoring current on the line when the switches are closed;
   opening the switches in response to an excessive monitored current;
   monitoring voltage on the line when the switches are open;

closing the switches in response to the monitored voltage being below a threshold level; and changing the threshold level between two successive closings of the switches.

9. A method as claimed in claim 8 and including the step of determining a predetermined period from a first closing of the switches responsive to the monitored voltage being below a first threshold level following a first opening of the switches, wherein the step of changing the threshold level comprises using a second threshold level, less than the first threshold level, for a second closing of the switches following a second opening of the switches which occurs within the predetermined period.

10. A method as claimed in claim 9 wherein the first threshold level corresponds to a common mode voltage on the line of the order of 180 volts rms.

11. A method as claimed in claim 9 wherein the second threshold level corresponds to a common mode voltage on the line of the order of 40 volts rms.

12. A method as claimed in claim 8 wherein the step of monitoring voltage on the line comprises rectifying and then low pass filtering common mode voltage on the line.

13. An automatic protection and recovery method for a telephone line interface circuit, comprising the steps of:

monitoring current on a wire of a telephone line to which the interface circuit supplies a drive voltage;

interrupting a connection of the interface circuit to the wire in response to the monitored current exceeding a threshold value;

reducing the drive voltage to a relatively low level;

reconnecting the interface circuit to the wire; and determining removal of a ground fault on the wire in dependence upon the monitored current on the wire supplied with the reduced drive voltage.

14. A method as claimed in claim 13 wherein the step of determining removal of a ground fault on the wire comprises the steps of varying the drive voltage in dependence upon the monitored current on the wire and monitoring the drive voltage.

15. A method of automatically detecting removal of a ground fault on a two-wire telephone line to which two terminals of a telephone line interface circuit are connected for supplying respective voltages thereto, comprising the steps of: controlling the voltages supplied to the terminals to produce a measurable common mode current in the presence of a ground fault and a relatively small or negligible loop current on the line; and monitoring current on the telephone line to detect removal of the ground fault.

16. A method as claimed in claim 15 wherein the step of controlling the volumes supplied to the terminals comprises applying a relatively small or negligible differential voltage to the two terminals to produce said relatively small or negligible loop current on the line.

17. A method as claimed in claim 16 and including the steps of: modifying the voltage supplied to at least one of the two terminals in dependence upon the monitored current to maintain a substantially constant monitored current in the presence of the ground fault; and monitoring the supplied voltage to detect removal of the ground fault.

18. A method as claimed in claim 15 and including the steps of: modifying the voltage supplied to at least one of the two terminals in dependence upon the monitored current to maintain a substantially constant monitored current in the presence of the ground fault; and monitoring the supplied voltage to detect removal of the ground fault.

19. An automatic protection and recovery method comprising the steps of: interrupting a connection of a telephone line interface circuit to a telephone line in response to current on the line exceeding a predetermined threshold; monitoring at least one variable to determine whether or not a criterion for reconnection of the interface circuit to the line for normal operation is satisfied; reconnecting the interface circuit to the line for normal operation in response to the criterion being satisfied; and counting successive interruptions of the connection each occurring within a predetermined period following a reconnection of the interface circuit to the line for normal operation, thereby to provide an indication of a state of the line interface circuit.

20. A method as claimed in claim 19 and including the step of determining the criterion for each reconnection in dependence upon the count of successive interruptions.

21. A method as claimed in claim 19 and including the step of maintaining an interruption of the connection for at least a predetermined period in response to a predetermined count of successive interruptions being reached.

22. A method as claimed in claim 19 and including the step of resetting the count of successive interruptions on expiry of a predetermined period following a reconnection of the line interface circuit to the line for normal operation.

23. An automatic protection method for a telephone line interface circuit coupled to two wires of a telephone line via respective switches, comprising the steps of:

cyclically providing an indication of an overcurrent in response to low pass filtered rectified common mode current on the line exceeding a predetermined threshold;

in each cycle, increasing a variable by a first amount if said indication is provided in the cycle and decreasing said variable by a second amount, smaller than the first amount, if said indication is not provided in the cycle; and opening the switches in response to the variable reaching a predetermined threshold.

24. A method as claimed in claim 23 and including the steps of, while said indication is provided in each cycle, determining any zero crossing of common mode current on the line and opening the switches in response to a determined zero crossing.

* * * * *